(12) United States Patent
Hester

(10) Patent No.: US 7,362,655 B1
(45) Date of Patent: Apr. 22, 2008

(54) TIME-SYNCHRONOUS ACOUSTIC SIGNAL RANGING SYSTEM AND METHOD

(75) Inventor: Samuel G. Hester, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 145 days.

(21) Appl. No.: 11/340,818

(22) Filed: Jan. 25, 2006

(51) Int. Cl.
*G01S 3/80* (2006.01)

(52) U.S. Cl. ........................... 367/127; 367/124
(58) Field of Classification Search ............. 367/118, 367/124, 127
See application file for complete search history.

(56) References Cited

U.S. PATENT DOCUMENTS

| | | | |
|---|---|---|---|
| 4,312,053 A | * | 1/1982 | Lipsky ................. 367/127 |
| 5,247,489 A | * | 9/1993 | Pirie .................... 367/127 |
| 5,303,206 A | * | 4/1994 | Bemb et al. ........... 367/127 |
| 5,491,670 A | * | 2/1996 | Weber .................. 367/127 |
| 6,532,192 B1 | * | 3/2003 | Reid .................... 367/127 |
| 7,038,589 B2 | * | 5/2006 | Schmidt et al. ....... 340/573.1 |

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

This is an underwater acoustic ranging system for determining a range to a target object. An acoustic receiver is provided for detecting acoustic energy and determining an angle of arrival of said acoustic energy in at least one plane. An acoustic transmitter transmits an acoustic energy pulse. A receiver clock joined to the receiver, and a transmitter clock is joined to the transmitter. Acoustic energy is transmitted at a synchronized time. Range can be calculated based on the transmit time, the receive time and the reception angle. The system can also include a means for synchronizing the clocks.

13 Claims, 1 Drawing Sheet

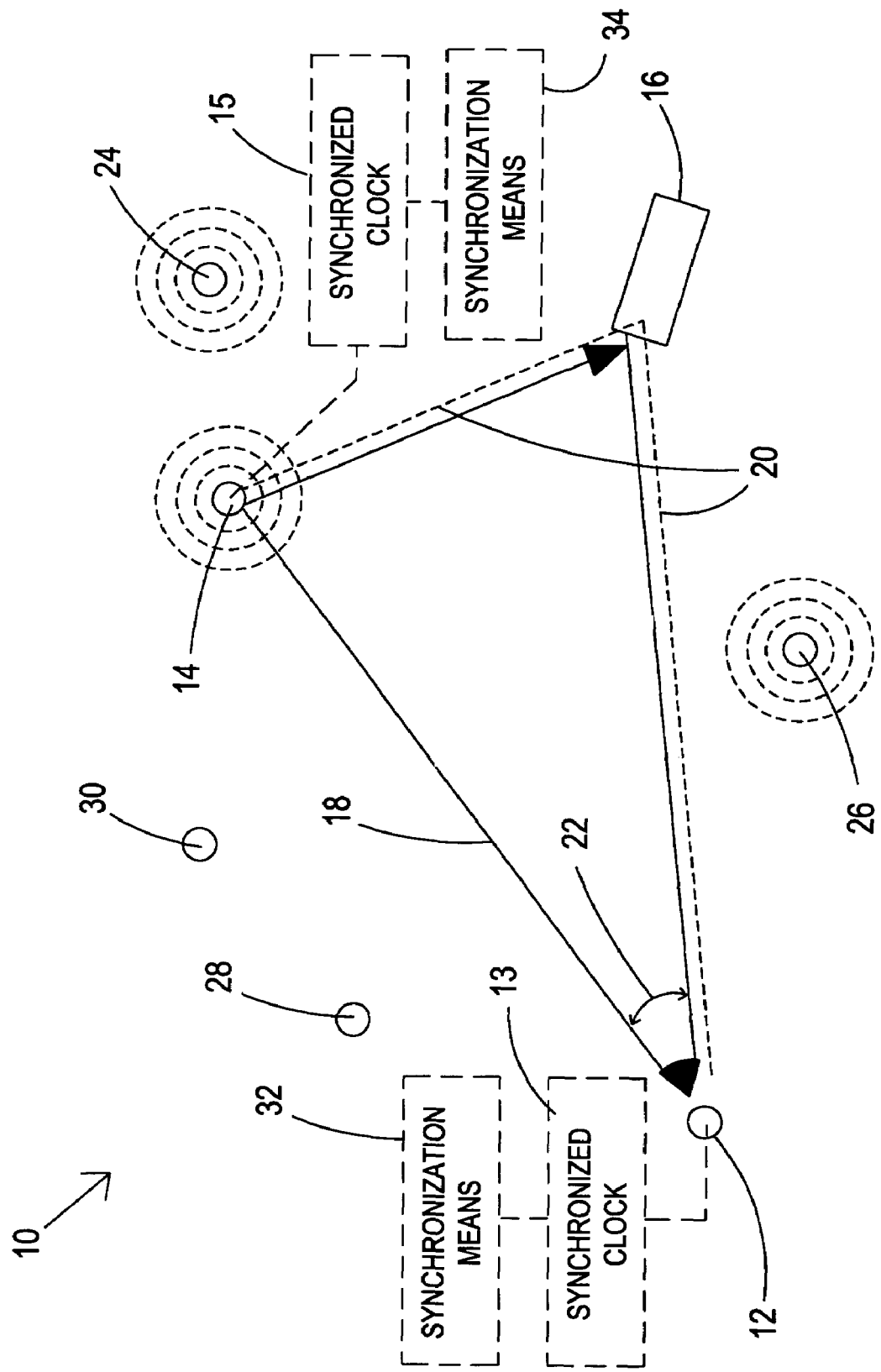

TIME-SYNCHRONOUS ACOUSTIC SIGNAL RANGING SYSTEM AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to acoustic ranging systems and, more particularly, to an acoustic ranging system for passive receiver determination of range to an underwater object utilizing one or more remotely located acoustic transmitters.

(2) Description of the Prior Art

The determination of range to an underwater object has historically been accomplished by one of two basic methodologies, passive and active.

Passive systems, typified by those in use in submarines for finding underwater adversaries, have known weaknesses. The target object must be radiating acoustic energy into the medium (water), so this method is useless against non-radiating targets and is directly dependent on the amount of acoustic radiation for radiating targets. Examples of completely non-radiating target objects include geographic features, submerged wreckage, and mines. Examples of weakly radiating target objects include diesel-electric submarines bottomed or otherwise operating on battery power.

Even for strongly radiating target objects, the range to the object must often be determined by indirect means involving receiver motion to generate time rates of change of bearing to the object or similar indirect techniques. These techniques are typically time consuming and prone to significant errors based on geometric configurations of the receiver and the target object. Signal strength at the receiver may also be used to estimate range but is notoriously inexact due to the propagation characteristics of sound in water and the necessity to know the precise acoustic energy output of the target object. Target acoustic energy output is not typically known except in controlled experimental conditions.

Active systems are often characterized by a receiver able to discern bearing in at least one plane and an active transmitter either collocated with the receiver or remote from the receiver. Prior art active systems also have known limitations. For instance, in the military application, the use of an active transmitter collocated with the receiver (mounted for this example on a submarine), may provide clues to the presence and location of the submarine. This potentially results in the target being alerted to the fact that it is under prosecution and evading. Active radiation for targeting localization purposes also provides a very good reverse bearing location to the transmitter, making an effective counterattack possible and placing the transmitting ship in jeopardy.

Locating the transmitter remotely from the receiver in certain types of active systems, sometimes referred to as "multi-static" systems, requires precise a priori knowledge of the location of the transmitter relative to the receiver, or the provision of that information simultaneous with the transmission via some type of communications link. For most maritime applications, it is desirable that at least the receiver is mobile, and usually that both transmitter and receiver be mobile, for purposes of portability and mission flexibility.

There are several different types of prior art active ranging systems which use remotely located transmitters. Each of these has disadvantages:

In an active ranging system with a mobile receiver and fixed transmitter there is a need to know with great accuracy the location of the fixed transmitter relative to the receiver platform. This is accomplished by techniques involving either precise geolocation of the transmitter at time of implantation and ongoing precise geolocation of the receiver platform as it moves around, or by techniques requiring ongoing communication between the receiver and the transmitter to pass locating information. While useful in undersea navigation applications, this technique has the weaknesses of non-portability and mission inflexibility (the fixed transmitter is only useful to searching vessel in range of its location), as well as requiring a continuous and reliable communications channel between transmitter and receiver.

For ranging systems that utilize a mobile receiver and mobile transmitter, precise knowledge of both mobile transmitter and mobile receiver geolocations is required. Accordingly, these systems require both sensitive navigational equipment on both platforms and a method of transferring communication information between the two.

Ranging systems that utilize a fixed receiver and a mobile transmitter are not known to have any useful applications, although a potential application in coastal surveillance can be readily envisioned. However, the limitations of this type of system would be the same as discussed above for the ranging system with a mobile receiver and fixed transmitter.

The following U.S. patents describe various prior art systems that may be related to the above and/or other ranging systems:

U.S. Pat. No. 4,173,008, issued Oct. 30, 1979, to Keith et al, discloses a method and apparatus for passively detecting, locating and tracking submerged or water-borne objects which generate acoustic radiation as they move through the water, including a hydrophone array which is linked to a monitoring station by cable or radio transmitters. The apparatus at the monitoring station includes a hydrophone selector for individually monitoring the output of each hydrophone, a band pass filter, a db meter and visual display apparatus. The db meter is provided with indicia to convert the difference in intensity in db for the hydrophones to a range or distance ratio from the hydrophones to the noise source. A fix on the noise source can be obtained by plotting range ratio circles or using a tactical display scope. Once the noise source is located, the db meter is calibrated to read directly the range from the hydrophones to the object.

U.S. Pat. No. 4,499,468, issued Feb. 12, 1985, to Montana et al, discloses a range-only multistatic radar system that has a plurality of radar stations located in a square grid pattern. Each radar station has a plurality of low power pulsed transmitters and receivers that operate on omnidirectional whip antennae. Echo information received by the receivers is transmitted to a computer wherein a technique is employed to deghost and identify real targets. The computer applies a range difference similarity test, a uniqueness test, and a position test to determine real targets from the plurality of echo returns received.

U.S. Pat. No. 5,168,471, issued Dec. 1, 1992, to Parra, discloses an integrated active/passive transducer system that includes an active transducer for converting ultrasonic electric energy to pressure waves launched in a body of water and converting reflected ultrasonic pressure waves from a target in the body of water to a first electrical signal. A passive transducer is coaxial with the active transducer, converting biosound pressure waves from a living organism in the body of water to second electrical signals. A first processing channel is connected to receive the first electrical signals and determine range to the target. A second processing channel is connected to receive the second electrical signals and provide a biosound signal. A logic system is connected to receive the first electrical signal and said biosound signal, to validate that the target is a living organism and not an inanimate object only in the presence of biosound signals, and an indication is connected to the logic means for indicating that the target is a living organism. The logic system includes a microprocessor and a temperature sensor measures the temperature of the body of water contiguous to the transducers and produces an electrical signal corresponding thereto. The microprocessor is programmed to correlate the biosound signals with the thermotropic characteristics, etc., of the living organism.

U.S. Pat. No. 5,168,473, issued Dec. 1, 1992, to Parra, discloses one or more passive transducers for converting sounds, including bio-soundwaves from a living aquatic animal source traveling in a body of water, to electrical signals, which is combined with active sonar (echo sounding) to form an integrated marine acoustic system. Moreover, a common display can be used and coupled with a satellite (GPS) or loran position locator so that a fishing vessel carrying the apparatus can have its position displayed on an electronically reproduced chart or map of an area along with the fish location, including an indication of the direction of fish movement, and fish species.

The above cited prior art does not disclose a ranging system that overcomes the problems discussed above. Accordingly, the solutions to the above described and/or related problems have been long sought without success. Consequently, those skilled in the art will appreciate the present invention that addresses the above and other problems.

SUMMARY OF THE INVENTION

It is a general purpose of the present invention to provide an improved underwater ranging system.

An object of the present invention is to provide a ranging system that utilizes one or more remotely located transmitters operating with a known timing.

An advantage of the present invention is elimination of the need for sensitive navigation equipment to provide precise information of the relative positions of the receiver and transmitter.

Another advantage is the elimination of the need for a communications link between the receiver and transmitter.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive or necessarily required list of objects, features, and advantages.

Accordingly, the present invention provides an underwater acoustic ranging system for determining a range to a target object and may comprise one or more components such as, for instance, an acoustic receiver operable for detecting acoustic energy and determining an angle of arrival of the acoustic energy in at least one plane. Other elements may comprise a remotely positioned active transmitter operable for transmitting acoustic energy. The present invention may also comprise an acoustic receiver clock for the acoustic receiver and an active transmitter clock for the active transmitter. The acoustic receiver clock and the active transmitter clock are synchronized. Therefore, the acoustic transmitter is operable for transmitting acoustic energy pulses with a timing based on the acoustic transmitter clock wherein the timing of transmission is determinable at the remotely positioned acoustic receiver clock.

In one preferred embodiment, the acoustic receiver further comprises a point-located hydrophone array. In another embodiment, the underwater acoustic ranging system may further comprise a plurality of spaced apart active transmitters. The underwater acoustic ranging system may further comprise a plurality of spaced apart receivers. The underwater receiver(s) and/or transmitter(s) may be but are not required to be moveable with respect to each other or the target object.

The range to the target object may be determined based on the following equation:

$$R_T = \left( \Delta t_2 + \Delta t_1 \cos\alpha - \frac{(\Delta t_1 \sin\alpha^2)}{\Delta t_2 - \Delta t_1 \cos\alpha} \right) \frac{c}{2} \quad (1)$$

where:
 $R_T$=range to target object
 $\Delta t_1$=time from transmission to receipt in a direct transmitter/receiver path
 $\Delta t_2$=time from transmission to receipt in a reflected path
 $\alpha$=difference in angle of arrival of paths
 c=sound speed in medium.

The present invention also comprises methods for underwater acoustic ranging to determine a range to a target object which may comprise one or more steps such as transmitting one or more acoustic pulses in a first transmission path and a second transmission path. The first transmission path may comprise a direct acoustic signal path for the acoustic pulses from a transmitter in a direct or substantially direct route to a receiver. The second transmission path may comprise a reflected path for the acoustic pulses from the transmitter to the target object and then reflected to the receiver. Other steps may comprise utilizing synchronized clocks at the transmitter and the receiver to determine a time of transmission for pulses. The invention may further comprise measuring a time of arrival at the receiver for the one or more pulses in the first transmission path and the second transmission path. As well, the invention may comprise measuring an angle at the receiver between the first transmission path and the second transmission path.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, and wherein:

The FIGURE schematically shows an underwater configuration of an acoustic ranging system in accord with one possible embodiment of the present invention.

DESCRIPTION OF THE PREFERRED EMBODIMENT

Referring now to the FIGURE, there is shown acoustic ranging system 10 in accord with the present invention. The passive receiver 12 and the active transmitter 14 contain respective synchronized clocks 13 and 15 which may typically comprise circuitry, processors, computers, or the like, for timing purposes, computing purposes, processing purposes, and the like as discussed hereinafter to effect underwater acoustic ranging to target object 16. Target object 16 may be a moving or non-moving underwater object. Passive receiver 12 and synchronized clock 13 may typically be collocated (positioned at the same location). Likewise, active transmitter 14 and synchronized clock 15 may typically be collocated. Accordingly, it is possible to program or otherwise predetermine operation of active transmitter 14 to produce signals, such as acoustic pulses or the like, at times which are known at passive receiver 12. Passive receiver 12 is preferably a point-located hydrophone array (as opposed to a spatially dispersed hydrophone array) capable of detecting acoustic energy and determining its angle of arrival in at least one plane (horizontal plane is illustrated.) Active transmitter 14 is for most operations preferably an omnidirectional acoustic transmitter which transmits the time-synchronized acoustic pulse(s). Each pulse arrives at passive receiver 12 via two acoustic paths 18 and 20. Acoustic path 18 is the path directly from transmitter 14, i.e., the transmission path from transmitter 14 to receiver 12. Acoustic path 20 is via reflection off of target object 16, i.e., the transmission path 14 to 16 followed by transmission path 16 to 12.

In operation, receiver 12 receives an acoustic signal from transmitter 14 along signal path 18 and discerns its associated angle (or angle 22 as illustrated) and time of arrival. Because the transmission of the acoustic pulse is time-synchronized, receiver 12 and/or an associated processor which may be part of receiver 12 or separate therefrom can also determine the differential time ($\Delta t_1$) between the time of transmission and time of receipt. Thus, using the speed of sound in water (nominal or in situ measurements), the length of path 18 and hence the range and angle to active transmitter 14 can be calculated as follows:

$$R_T = R_B = (t_a - t_r)c \quad (2)$$

$R_T$=range to target $R_B$=range to transmitter $t_a$=time of arrival $t_r$=time of transmission C=speed of sound in water Similarly, the length of the two-leg path from transmitter 14 to receiver 12 via reflection from target object 16 can be calculated, since both time of transmission and time of arrival are known. With some mathematical manipulation, it is possible to determine the length of path 20 knowing only the time delay between signal transmission and arrival at receiver 12 via path 18 ($\Delta t1$), via path 20($\Delta t2$), and the difference in angles of arrival, i.e., in the example shown angle 22. The equation is:

$$R_T = \left( \Delta t_2 + \Delta t_1 \cos\alpha - \frac{(\Delta t_1 \sin\alpha^2)}{\Delta t_2 - \Delta t_1 \cos\alpha} \right) \frac{c}{2} \quad (3)$$

where:

$R_T$=range to target object $\Delta t_1$=time from transmission to receipt in a direct transmitter/receiver path $\Delta t_2$=time from transmission to receipt in a reflected path $\alpha$=difference in angle of arrival of paths c=sound speed in medium.

Computer model tests have shown this equation to be valid through a wide range of triangulation geometries, including degenerate cases where the transmitter and target object were on the same or reciprocal bearings.

Acoustic ranging system 10 of the present invention therefore has numerous advantages as compared to those discussed in the background section. Acoustic ranging system requires no navigational knowledge for either receiver or transmitter. Acoustic ranging system requires no information between receiver 12 or transmitter 14 other than initial clock synchronization and the acoustic signal itself. System 10 requires no motion by transmitter, receiver, or target object to determine range, i.e., system 10 does not need to make projections or collect data at different locations to determine the range. System 10 allows for complete covertness of the receiver location, since transmitter 14 is not collocated. System 10 requires only a single receiver 12 to localize target object.

The acoustic ranging system can also include a synchronization means 32 joined to synchronizing clock 13 attached to receiver 12 and a synchronization means 34 joined to the transmitting clock 15. Various devices can be utilized for synchronizing the two clocks 13 and 15. These may include but are not limited to direct synchronization between the clocks, radio synchronization between the clocks, and synchronization with one or more external time sources. Direct synchronization would involve directly connecting the clocks and setting them to a common time. Radio synchronization requires each clock to be joined in a radio transmitter/receiver pair to synchronize by any of several protocols. One means of synchronization with external time sources requires that each synchronization means have a radio receiver for receiving an external time signal. The external radio receiver can be a time only transmitter such as that provided by the United States National Institute of Standards or it can be a satellite based transmitter such as the Global Positioning System. Another means of synchronization could utilize the internet.

It will be understood that the present invention may be implemented in numerous different embodiments. For instance, the present invention may comprise a mobile receiver/stationary transmitter embodiment for underwater vehicle navigation and monitoring, e.g., harbors, waterways, and the like. The present invention may also comprise a stationary receiver/mobile transmitter embodiment for surveillance applications. The present invention may also comprise multiple transmitters, e.g., transmitters 24 and 26, with independent and identifiable time-synchronized pulses to localize the target in three dimensions, provide separate independent checks on target object locations, and provide redundancy in case of technical or acoustic path failure. The present invention may also comprise multiple receivers, e.g., receivers 28 and 30, to localize the target simultaneously, thereby reducing inherent uncertainties associated with acoustic paths and sound speeds. In some of these embodiments, information connections may be present, e.g., a submarine with several different spaced receivers could have information flow between the receivers or to a processor. Many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An underwater acoustic ranging system for determining a range to a target object, comprising:
    an acoustic receiver for detecting acoustic energy and determining an angle of arrival of said acoustic energy in at least one plane;
    an acoustic transmitter for transmitting acoustic energy pulses, said active transmitter being spaced apart from said acoustic receiver;
    a receiver clock joined to said acoustic receiver; and
    a transmitter clock joined to said transmitter, said acoustic receiver clock and said transmitter clock being synchronized, said transmitter being operable for transmitting said acoustic energy pulses with a timing based on said transmitter clock, said timing being determinable with said receiver clock, said receiver calculating the range based on said timing and the angle of arrival
    wherein said range to said target object is determined based on the following equation:

$$R_T = \left( \Delta t_2 + \Delta t_1 \cos\alpha - \frac{(\Delta t_1 \sin\alpha)^2}{\Delta t_2 - \Delta t_1 \cos\alpha} \right) \frac{c}{2}$$

where:
    $R_T$=range to target object;
    $\Delta t_1$=time from transmission to receipt in a direct transmitter/receiver path;
    $\Delta t_2$=time from transmission to receipt in a reflected path;
    $\alpha$=difference in angle of arrival of paths; and
    c=sound speed in medium.

2. The underwater acoustic ranging system of claim 1, wherein said acoustic receiver further comprises a point-located hydrophone array.

3. The underwater acoustic ranging system of claim 1, wherein said acoustic transmitter comprises a plurality of spaced apart active transmitters.

4. The underwater acoustic ranging system of claim 1, wherein said acoustic receiver further comprises a plurality of spaced apart receivers.

5. The underwater acoustic ranging system of claim 1, wherein at least one of said acoustic transmitter and said acoustic receiver is moveable with respect to the other and the target object.

6. The underwater acoustic ranging system of claim 1, further comprising:
    a first means for synchronizing joined to said receiver clock; and
    a second means for synchronizing joined to said transmitter clock, said first and second means cooperating to give said receiver clock and said transmitter clock the same time.

7. The underwater acoustic ranging system of claim 6, wherein:
    said first means for synchronizing comprises a radio receiver for receiving a time signal; and
    said second means for synchronizing comprises a second radio receiver for receiving a time signal.

8. A method for underwater acoustic ranging to determine a range to a target object, comprising:
    transmitting at least one acoustic pulse at a synchronized time;
    receiving said transmitted acoustic pulse from a first transmission path and a second transmission path, said first transmission path being from a transmitting location to a receiving location in a substantially direct route, said second transmission path being from the transmitting location to a target object location and then by reflection to the receiving location;
    measuring a time of arrival at said receiving location for said acoustic pulses in said first transmission path and said second transmission path;
    measuring an angle at said receiving location between said first transmission path and said second transmission path; and
    determining the range from said receiving location to said target object location from the measured times of arrival and said measured angle, wherein said step of determining utilizes:

$$R_T = \left( \Delta t_2 + \Delta t_1 \cos\alpha - \frac{(\Delta t_1 \sin\alpha)^2}{\Delta t_2 - \Delta t_1 \cos\alpha} \right) \frac{c}{2}$$

where:
    $R_T$=range to target object;
    $\Delta t_1$=time from transmission to receipt in a direct transmitter/receiver path;
    $\Delta t_2$=time from transmission to receipt in a reflected path;
    $\alpha$=difference in angle of arrival of paths;
    c=sound speed in medium to determine the range to said target object location.

9. The method of claim 8, wherein said step of transmitting transmits multiple acoustic pulses each being transmitted from a different transmitter location.

10. The method of claim 8, wherein said step of receiving allows reception of said acoustic pulses at multiple receiving locations.

11. The method of claim 8, further comprising synchronizing the time at the transmitting location and the receiving location.

12. The method of claim 11, wherein the step of synchronizing comprises:
    receiving a standard time from a time source at the transmitting location; and
    receiving a standard time from a time source at the receiving location.

13. The method of claim 11, wherein the step of synchronizing comprises communicating a standard time between the transmitting location and the receiving location.

* * * * *